US010415624B2

(12) United States Patent
Giannakopoulos et al.

(10) Patent No.: US 10,415,624 B2
(45) Date of Patent: Sep. 17, 2019

(54) BOLT RETENTION ASSEMBLY FOR GAS TURBINE ENGINE

(71) Applicant: United Technologies Corporation, Farmington, CT (US)

(72) Inventors: Konstantinos Panagiotis Giannakopoulos, Middletown, CT (US); Christopher B. Jelks, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 182 days.

(21) Appl. No.: 15/606,580

(22) Filed: May 26, 2017

(65) Prior Publication Data

US 2018/0340565 A1 Nov. 29, 2018

(51) Int. Cl.

| | |
|---|---|
| ***F16B 39/10*** | (2006.01) |
| ***F02C 7/32*** | (2006.01) |
| ***F01D 5/06*** | (2006.01) |
| ***F16B 37/04*** | (2006.01) |
| ***F16B 41/00*** | (2006.01) |
| *F16B 43/02* | (2006.01) |

(52) U.S. Cl.

CPC .............. *F16B 39/10* (2013.01); *F01D 5/066* (2013.01); *F02C 7/32* (2013.01); *F16B 37/043* (2013.01); *F16B 41/002* (2013.01); *F05D 2230/60* (2013.01); *F05D 2230/70* (2013.01); *F05D 2260/31* (2013.01); *F16B 43/025* (2013.01)

(58) Field of Classification Search

CPC ...... F16B 37/043; F16B 39/10; F16B 39/108; F16B 41/002; F16B 43/025

USPC ......................... 411/119, 120, 121, 122, 123

See application file for complete search history.

(56) References Cited

U.S. PATENT DOCUMENTS

| | | | | |
|---|---|---|---|---|
| 4,887,949 A | | 12/1989 | Dimmick, III et al. | |
| 5,388,963 A | | 2/1995 | Dimmick, III et al. | |
| 6,854,941 B2 | * | 2/2005 | Csik | F16B 37/044 411/111 |
| 7,527,464 B2 | * | 5/2009 | Stewart | F16B 21/09 411/107 |
| 8,206,070 B2 | * | 6/2012 | Walker | F16B 37/061 411/119 |

(Continued)

FOREIGN PATENT DOCUMENTS

| | | |
|---|---|---|
| FR | 1285107 A | 2/1962 |

OTHER PUBLICATIONS

Search Report regarding related EP App. No. 18 17 3966; dated Nov. 22, 2018; 11 pgs.

*Primary Examiner* — Roberta S Delisle

(74) *Attorney, Agent, or Firm* — Cantor Colburn LLP

(57) ABSTRACT

A bolt retention clip for a gas turbine engine rotor assembly includes a main plate section defining a central aperture, the central aperture sized to receive a bolt therethrough. Also included is a pair of bolt retention tabs extending away from a first face of the main plate section to axially retain a head of the bolt. Further included is a first clip retaining tab extending away from the first face of the main plate section for insertion into a groove of a rotor structure. Yet further included is a second clip retaining tab extending away from a second face of the main plate section for engagement with an edge of the rotor structure.

12 Claims, 6 Drawing Sheets

164 168 152 172 160 166 159 162 174 178 176 170

(56) References Cited

U.S. PATENT DOCUMENTS

2013/0183117 A1 7/2013 Warburton
2014/0174088 A1* 6/2014 Ruberte Sanchez ...... F02K 3/10
60/722

* cited by examiner

BOLT RETENTION ASSEMBLY FOR GAS TURBINE ENGINE

BACKGROUND

Exemplary embodiments pertain to the art of gas turbine engines and, more particularly, to a bolt retention assembly for use in gas turbine engines.

Gas turbine engines include many components that must be mechanically coupled to each other in a variety of ways. Rotor stages are arranged in a stacked relationship with their radially inner portions mechanically fixed to each other and to a rotor hub. For example, the components may be bolted together, but assembly is often cumbersome. A retention clip may be employed to hold the bolt in place during assembly while an assembly technician secures a nut to an end of the bolt. Current retention clips provide a single point for loading. This allows the clip to disengage from the rotor when it is not properly loaded or too loosely tolerance. When the clip disengages from the rotor the clip and bolt will fall out and they are not accessible by the technician because it is a blind assembly, causing them to take the stack apart and reassemble the entire stack once more. Therefore, improvements related to bolt retention during assembly is desired.

BRIEF DESCRIPTION

Disclosed is a bolt retention clip for a gas turbine engine rotor assembly including a main plate section defining a central aperture, the central aperture sized to receive a bolt therethrough. Also included is a pair of bolt retention tabs extending away from a first face of the main plate section to axially retain a head of the bolt. Further included is a first clip retaining tab extending away from the first face of the main plate section for insertion into a groove of a rotor structure. Yet further included is a second clip retaining tab extending away from a second face of the main plate section for engagement with an edge of the rotor structure.

In addition to one or more of the features described above, or as an alternative, further embodiments may include that the bolt retention tabs are flexibly hinged to the main plate section.

In addition to one or more of the features described above, or as an alternative, further embodiments may include that the bolt retention tabs extend perpendicularly to the main plate section.

In addition to one or more of the features described above, or as an alternative, further embodiments may include that the first clip retaining tab extends perpendicularly to the main plate section.

In addition to one or more of the features described above, or as an alternative, further embodiments may include that the second clip retaining tab comprises a first segment and a second segment, the first segment extending perpendicularly from the main plate section and the second segment extending perpendicularly from the first segment to define a U-shaped slot with the main plate section.

Also disclosed is a bolt retention assembly for a gas turbine engine rotor assembly including a plurality of rotor stages and a rotor hub disposed in a stacked arrangement, each of the rotor stages and the rotor hub defining respective holes. Also included is a bolt extending through the holes of the rotor stages and the rotor hub. Further included is a retention clip that includes a main plate section defining a central aperture, the central aperture sized to receive the bolt therethrough. The retention clip also includes a pair of bolt retention tabs extending away from a first face of the main plate section to axially retain a head of the bolt. The retention clip further includes a first clip retaining tab extending away from the first face of the main plate section for insertion into a groove defined by a rotor structure that is one of the rotor stages or the rotor hub. The retention clip yet further includes a second clip retaining tab extending away from a second face of the main plate section for engagement with an edge of the rotor structure.

In addition to one or more of the features described above, or as an alternative, further embodiments may include that the bolt retention tabs are flexibly hinged to the main plate section.

In addition to one or more of the features described above, or as an alternative, further embodiments may include that the bolt retention tabs extend perpendicularly to the main plate section.

In addition to one or more of the features described above, or as an alternative, further embodiments may include that the first clip retaining tab extends perpendicularly to the main plate section.

In addition to one or more of the features described above, or as an alternative, further embodiments may include that the groove of the rotor structure is defined by a main portion of the rotor structure and a rail of the rotor structure.

In addition to one or more of the features described above, or as an alternative, further embodiments may include that the second clip retaining tab comprises a first segment and a second segment, the first segment extending perpendicularly from the main plate section and the second segment extending perpendicularly from the first segment to define a U-shaped slot with the main plate section.

In addition to one or more of the features described above, or as an alternative, further embodiments may include that the edge of the rotor structure is disposed in the U-shaped groove in an assembled condition of the bolt retention clip and the rotor structure.

In addition to one or more of the features described above, or as an alternative, further embodiments may include that the rotor structure includes a recess located adjacent the edge engaged with the second clip retaining tab.

In addition to one or more of the features described above, or as an alternative, further embodiments may include that the edge of the rotor structure and the second clip retaining tab are sized to be in an interference fit.

In addition to one or more of the features described above, or as an alternative, further embodiments may include that the bolt is a T-bolt.

In addition to one or more of the features described above, or as an alternative, further embodiments may include a nut secured to the bolt.

In addition to one or more of the features described above, or as an alternative, further embodiments may include that the plurality of rotor stages comprises a first rotor stage, a second rotor stage, and a third rotor stage.

In addition to one or more of the features described above, or as an alternative, further embodiments may include that the rotor structure is part of the third rotor stage.

Further disclosed is a method of assembling a rotor assembly including inserting a first clip retaining tab of a bolt retention clip into a groove defined by a rotor structure that is part of a third rotor stage. Also included is inserting an edge portion of the rotor structure into a slot defined by the bolt retention clip. Further included is inserting a bolt through a central aperture of the bolt retention clip and through a hold defined by the rotor structure. Yet further included is aligning a plurality of holes, each of the plurality of holes defined by a rotor structure of a first rotor stage, a second rotor stage and a rotor hub. Also included is lowering the first rotor stage, the second rotor stage and the rotor hub onto the third rotor stage and inserting the bolt through the plurality of holes. Further included is securing the rotor stage, the second rotor stage, the rotor hub, and the third rotor stage together by torqueing a nut onto the bolt.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
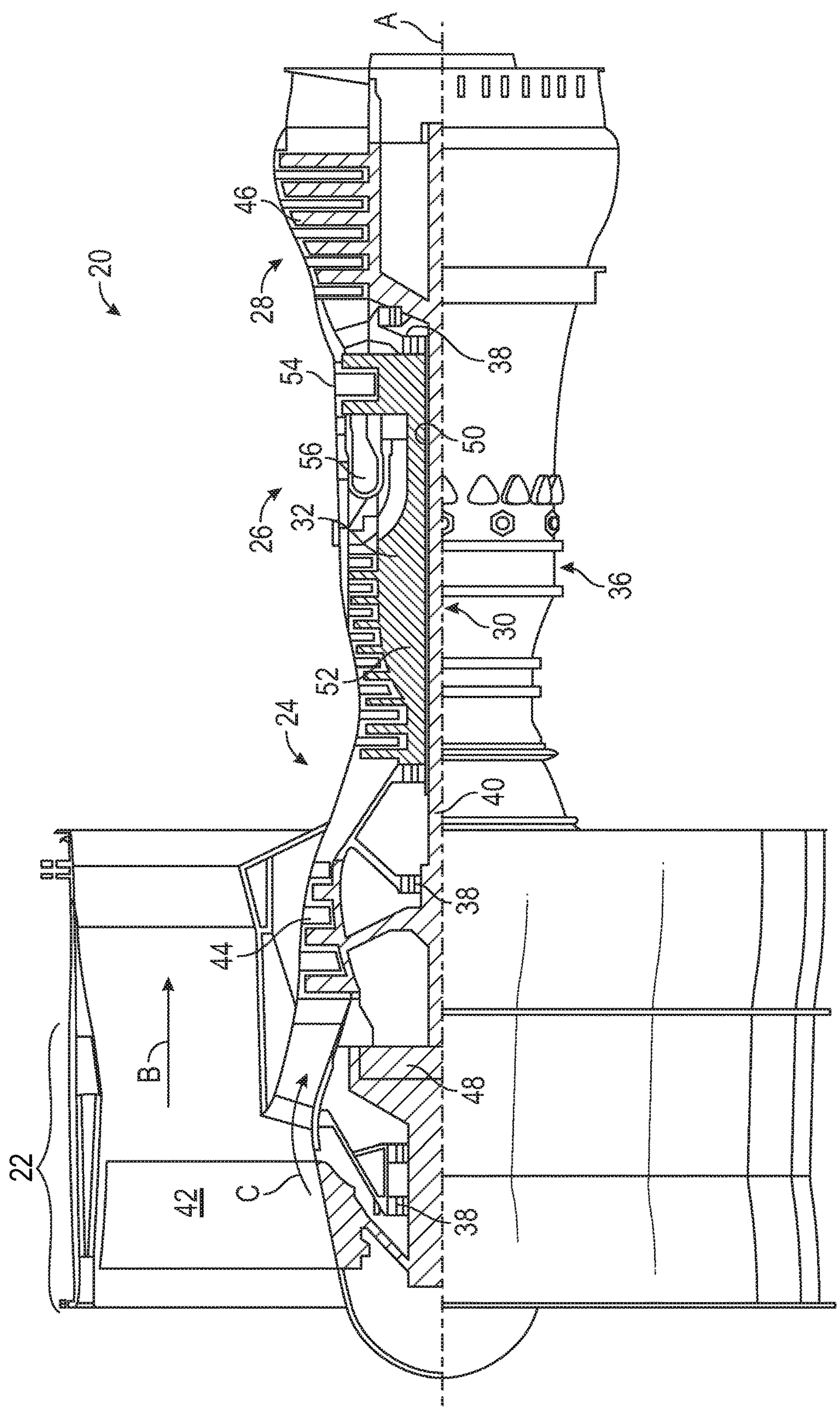
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 m/sec).

Figure 3:
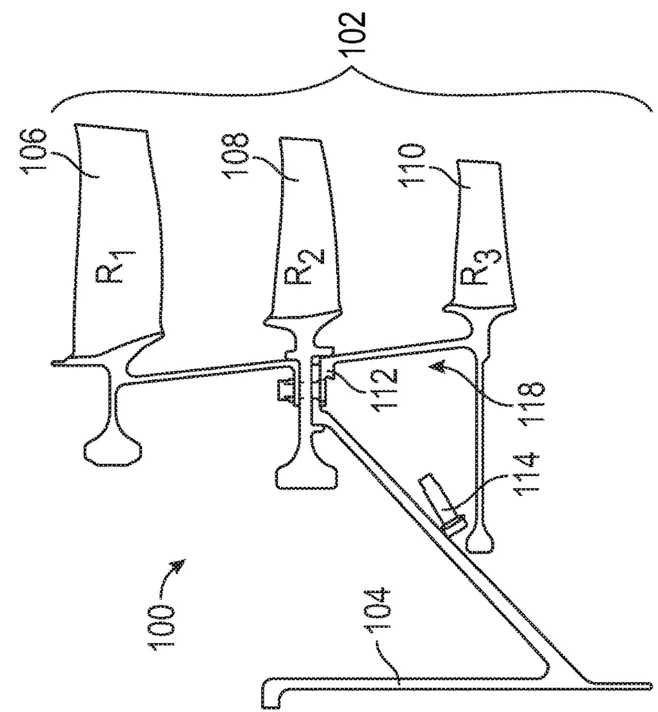
FIG. 3 is the rotor assembly of FIG. 2 illustrated in a second assembly condition.
Figure 2:
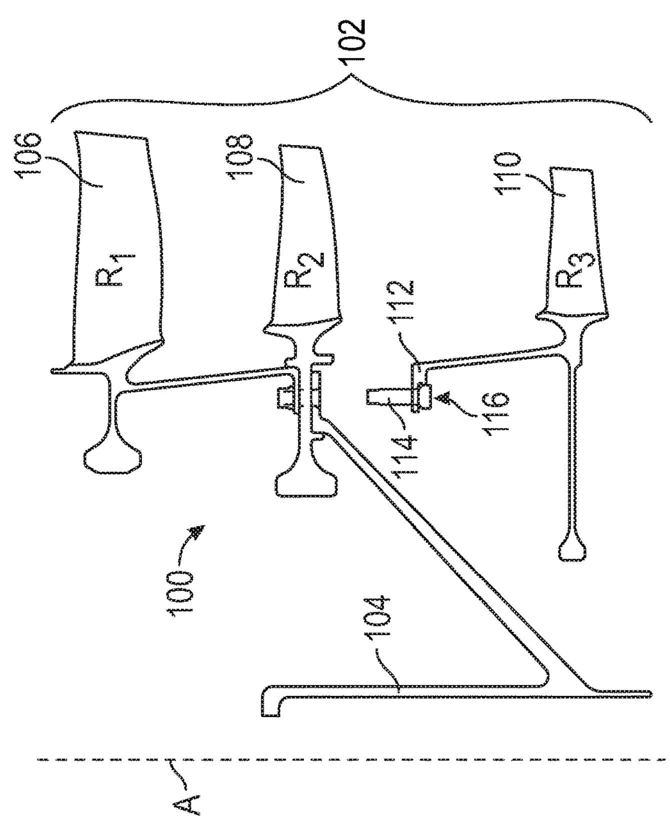
FIG. 2 is a rotor assembly illustrated in a first assembly condition, illustrating a first type of bolt retention assembly.

Referring now to FIGS. 2 and 3, a rotor assembly is illustrated and generally referenced with numeral 100. The rotor assembly 100 includes a plurality of rotor stages 102 and a rotor hub 104. In the illustrated embodiment, three rotor stages are shown. In particular, a first rotor stage 106, a second rotor stage 108, and a third rotor stage 110. It is to be appreciated that more or less than three stages may be present in some embodiments. Each of the rotor stages 102 include a plurality of rotor blades that extend circumferentially around the rotor hub 104, although a single blade is shown for each rotor stage.

The rotor stages 102 and the rotor hub 104 are to be arranged in a stacked manner and bolted together in a final assembled condition. FIG. 2 shows the first rotor stage 106, the second rotor stage 108 and the rotor hub 104 stacked together, but not yet joined with the third rotor stage 110. The first rotor stage 106, the second rotor stage 108 and the rotor hub 104 are lowered onto a rotor structure 112 of the third rotor stage 110. A bolt 114 is fixed to the rotor structure 112 with a bolt retention assembly 116 in a pre-assembled manner and is configured to be inserted through holes of the first rotor stage 106, the second rotor stage 108 and the rotor hub 104 for final assembly. Unfortunately, the illustrated bolt retention assembly 116 includes a bolt retention clip that only loads in one location and is susceptible to disengagement with the rotor structure 112. As shown in FIG. 3, upon disengagement, the bolt 114 may fall into an enclosed space 118 that does not allow for easy retrieval of the bolt 114, thereby requiring disassembly of the stacked rotor assembly.

Figure 4:
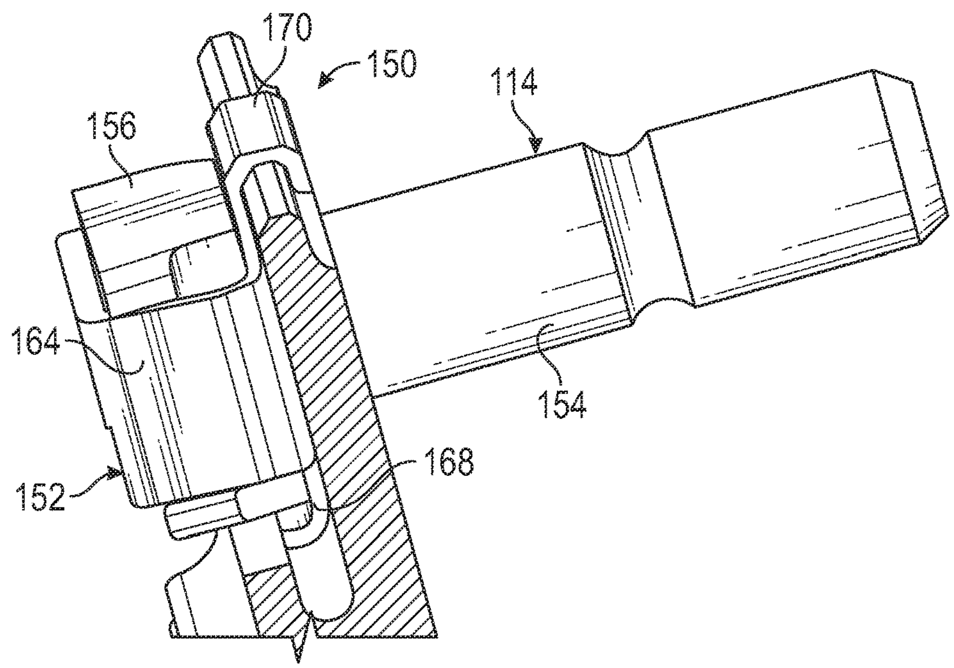
FIG. 4 is a perspective view of a bolt retention assembly of the present disclosure.
Figure 5:
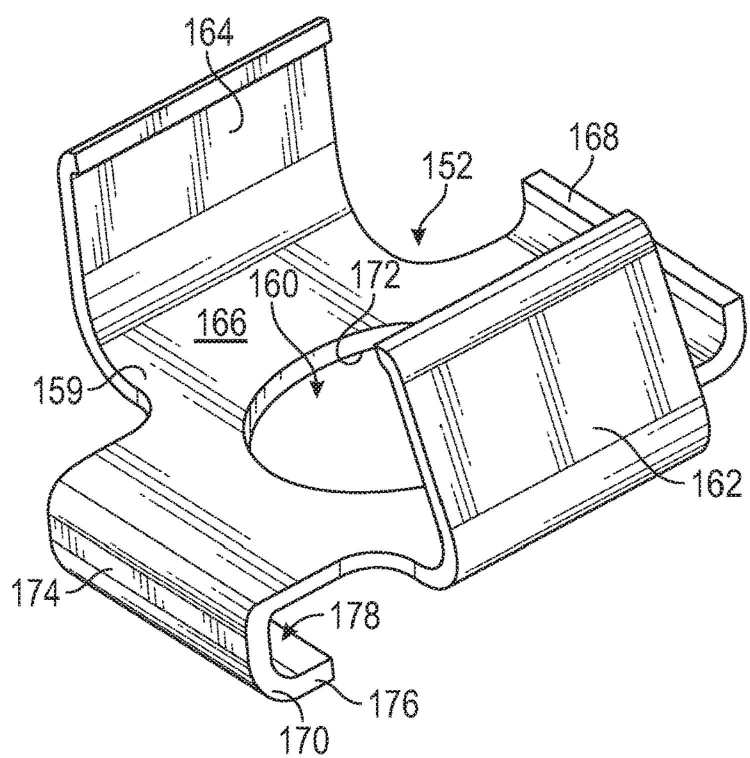
FIG. 5 is a perspective view of a bolt retention clip of the bolt retention assembly of FIG. 4.

Referring now to FIGS. 4 and 5, illustrated is a bolt retention assembly 150 according to the embodiments disclosed herein. As will be appreciated from the disclosure herein, the bolt retention assembly 150 provides a more reliable assembly process by preventing mishandling of the bolt 114 that may occur with other retention assemblies.

The bolt retention assembly 150 includes the bolt 114, a bolt retention clip 152 and the rotor structure 112 that the bolt retention clip 152 engages. The bolt 114 is a T-bolt in the illustrated embodiment, but other types of mechanical fasteners are contemplated. The bolt 114 includes a shank portion 154 and a head portion 156. As described above, the rotor structure 112 is a portion of the third rotor stage 110 that defines a hole 158 (FIGS. 6 and 7) that is aligned with holes of the other rotor assembly components, the holes configured to receive the bolt 114 therethrough for assembly.

The bolt retention clip 152 includes a main plate section 159 that defines a central aperture 160 that is to be aligned with the hole 158 and is also sized to receive the bolt 114 therethrough. The bolt retention clip 152 includes a pair of bolt retention tabs, such as a first bolt retention tab 162 and a second bolt retention tab 164. Each of the bolt retention tabs 162, 164 extend away from a first face 166 of the main plate section 159. At least one of the bolt retention tabs 162, 164 are flexibly hinged to the main plate section 159 to allow insertion of the head portion 156 of the bolt 114 and to axially retain the head portion 156 to the bolt retention clip 152 upon insertion. The bolt retention clip 152 includes a first clip retaining tab 168 extending away from the first face 166 of the main plate section 159. The first clip retaining tab 168 extends substantially perpendicularly from the main plate section 159 in some embodiments. A second clip retaining tab 170 extends away from a second face 172 of the main plate section 159. In the illustrated embodiment, the second clip retaining tab 170 is substantially L-shaped, with a first segment 174 extending substantially perpendicularly from the main plate section 159 and a second segment 176 extending perpendicularly from the first segment 174 to form a U-shaped slot 178. The first segment 174 and the second segment 176 of the second clip retaining tab 170 may also be considered independent tabs, such as second and third clip retaining tabs, respectively. The first and second clip retaining tabs 168, 170 provide loading and retention locations for the bolt retention clip 152 relative to the rotor structure 112, as described herein.

Figure 7:
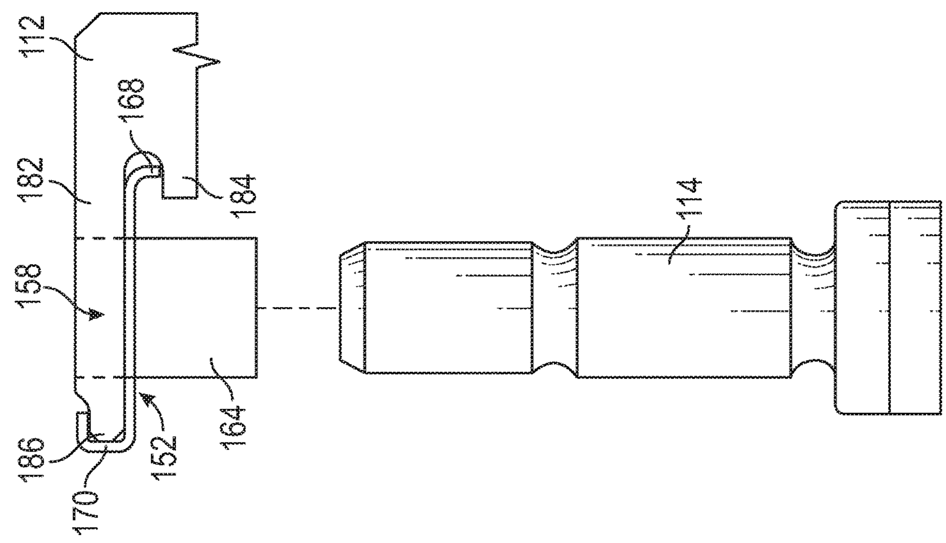
FIG. 7 is a view of the bolt retention assembly of FIG. 4 in a second assembly condition.
Figure 6:
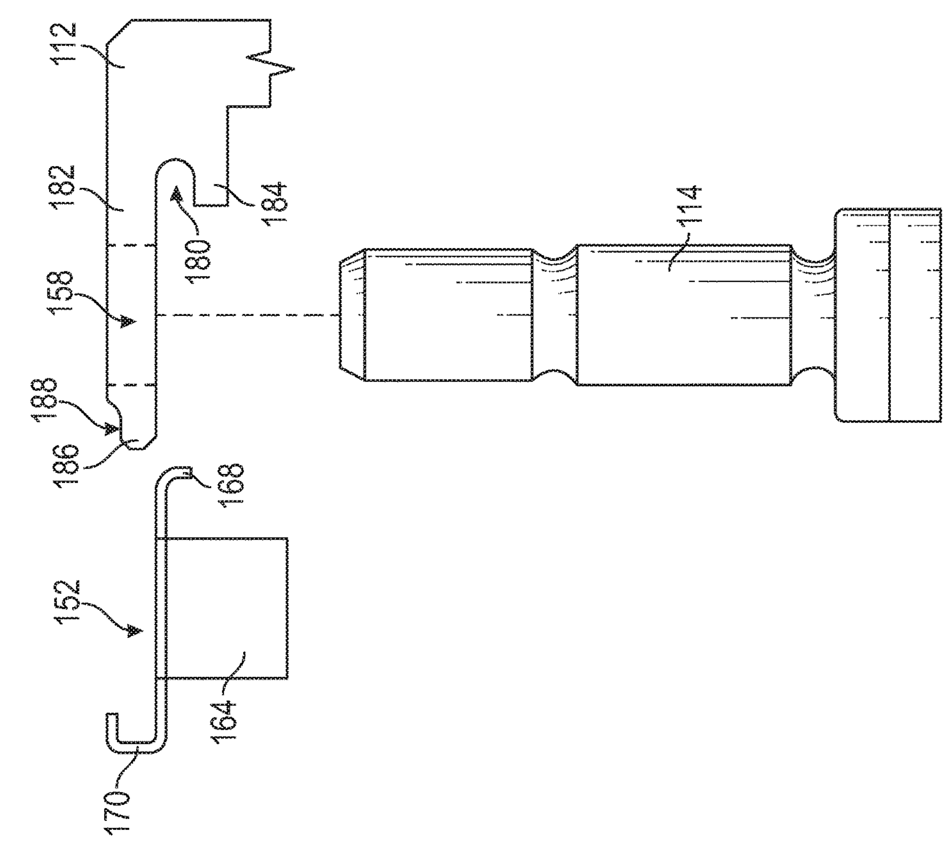
FIG. 6 is a view of the bolt retention assembly of FIG. 4 in a first assembly condition.

FIGS. 6-10 illustrate the bolt retention assembly 150 at various stages of the assembly process to demonstrate the interaction of the components. Initially, the bolt retention clip 152 is oriented to position the first clip retaining tab 168 closest to the rotor structure 112 (FIG. 6). The first clip retaining tab 168 is inserted into a groove 180 that is defined by a main portion 182 of the rotor structure 112 and a rail 184 of the rotor structure 112 (FIG. 7). During insertion of the first clip retaining tab 168 into the groove 180, the second clip retaining tab 170 engages an edge 186 of the main portion 182 of the rotor structure 112. Based on the U-shaped geometry of the second clip retaining tab 170, the edge 186 is disposed within the U-shape and the components are sized to provide an interference fit in some embodiments, thereby reducing the likelihood of inadvertent removal. As shown, a recess 188 of the main portion 182 proximate the edge 186 may be provided. The first and second clip retaining tabs 168, 170 (i.e., first clip retaining tab 168, as well as first and second segments 174 of second clip retaining tab) provide three loading interfaces for the bolt retention clip 152 and the rotor structure 112 to ensure a reliable engagement between the components. The geometry of the bolt retention clip 152 also prevents the ability of a technician to pre-assemble the bolt retention clip 152 and the bolt 114.

Figure 9:
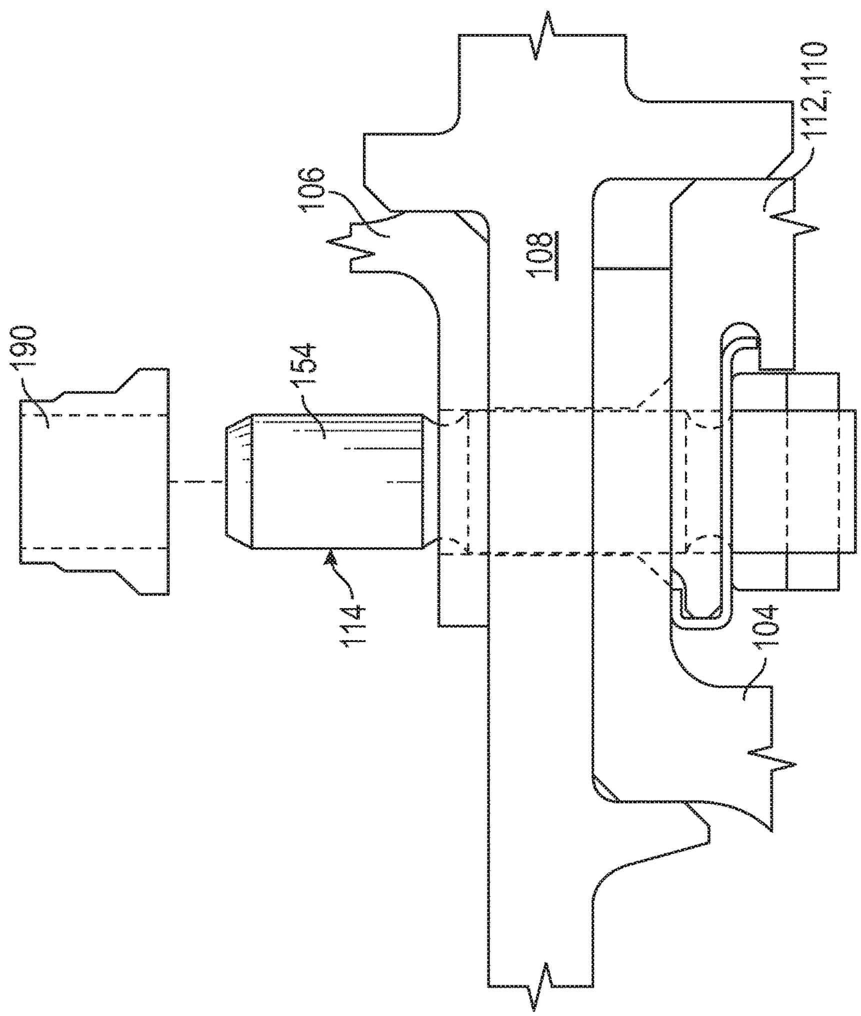
FIG. 9 is a view of the bolt retention assembly of FIG. 4 in a fourth assembly condition.
Figure 8:
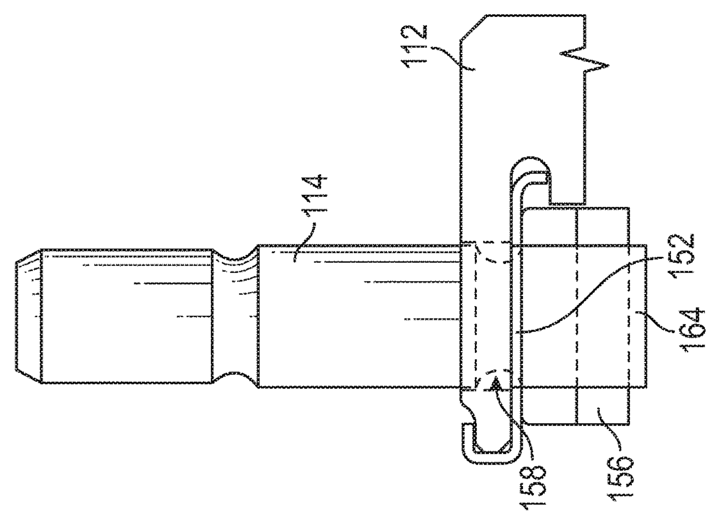
FIG. 8 is a view of the bolt retention assembly of FIG. 4 in a third assembly condition.
Figure 10:
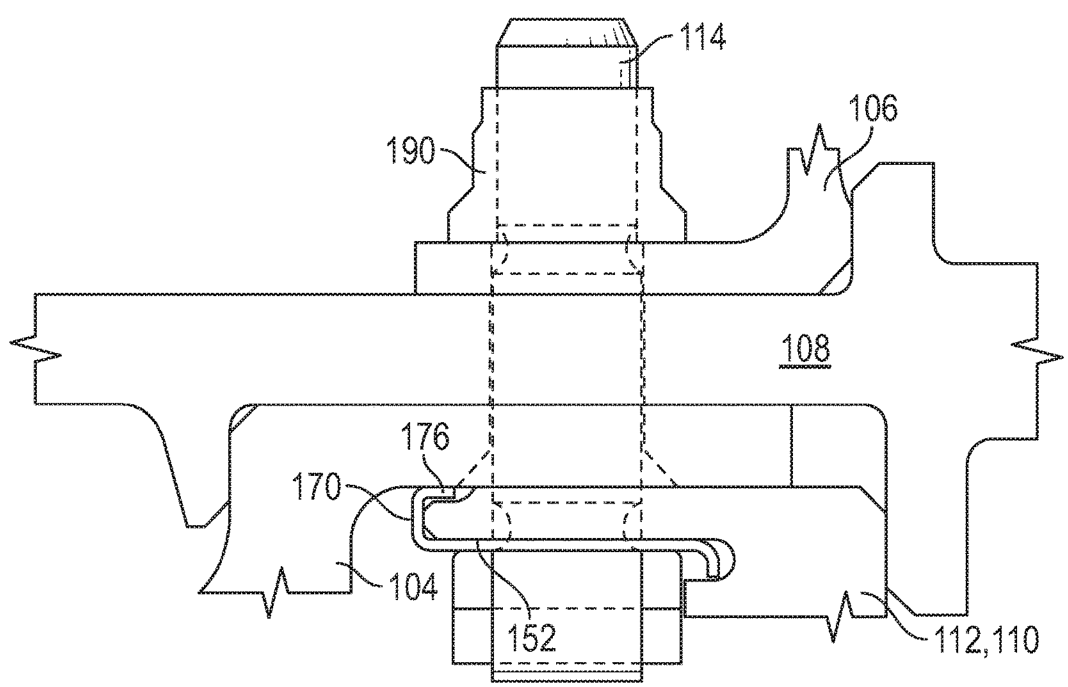
FIG. 10 is a view of the bolt retention assembly of FIG. 4 in a fifth and final assembly condition.

As shown in FIG. 8, the bolt 114 may be inserted through the central aperture 160 of the bolt retention clip 152 and through the hole 158 of the rotor structure 112 once the bolt retention clip 152 is secured to the rotor structure 112. Insertion of the bolt 114 over a sufficient distance locates the head portion 156 of the bolt 114 between the pair of bolt retention tabs 162, 164. Once positioned between the tabs, the head portion 156 is secured therein and prevented from axial movement due to the axial retention of the tabs, thereby preventing inadvertent withdrawal of the bolt 114. Once the bolt is fully inserted, the remaining portions of the rotor assembly 100 are lowered onto the bolt 114 that is retained to the rotor structure 112. In the illustrated embodiment, this entails lowering the first rotor stage 106, the second rotor stage 108 and the rotor hub 104 onto the third rotor stage 110. Once the stacked arrangement is complete, a nut 190 is fastened to the shank portion 154 of the bolt 114 to secure the stacked assembly, as shown in FIGS. 9 and 10. In the final assembled condition of FIG. 10, when the nut 190 is torqued to the bolt 114, the rotor hub 104 presses against the second segment 176 of the second clip retaining tab 170 to create a damper and eliminate any vibration generated when there is an unconstrained engagement between the bolt retention clip 152 and the rotor structure 112. The second segment 176 of the second clip retaining tab 170 may also be coated to help increase the reduction of vibrations through the clip 152.

Several benefits are provided by the bolt retention assembly disclosed herein. The clip 152 is designed so that it can only be installed one way onto the rotor structure 112. The clip 152 prevents the clip 152 and the bolt 114 from being installed to the rotor structure 112 as an assembly. The clip 152 is securely held in place during assembly. The clip 152 provides three locations where the bolt 114 can now be axially retained when released by the technician. This allows for blind assemblies to occur where restacking of the rotors would be required when prior clip designs would pop out.

The three point loading system also assists with prevention of bolt movement and allows for an improved alignment with the mating hole.

The term “about” is intended to include the degree of error associated with measurement of the particular quantity based upon the equipment available at the time of filing the application. For example, “about” can include a range of ±8% or 5%, or 2% of a given value.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bolt retention assembly for a gas turbine engine rotor assembly comprising:

- a plurality of rotor stages and a rotor hub disposed in a stacked arrangement, each of the rotor stages and the rotor hub defining respective holes;
- a bolt extending through the holes of the rotor stages and the rotor hub; and
- a retention clip comprising:
  - a main plate section defining a central aperture, the central aperture sized to receive the bolt therethrough;
  - a pair of bolt retention tabs extending away from a first face of the main plate section to axially retain a head of the bolt;
  - a first clip retaining tab extending away from the first face of the main plate section for insertion into a groove defined by a rotor structure that is one of the rotor stages or the rotor hub, wherein the groove is defined by a main portion of the rotor structure and a rail of the rotor structure; and
  - a second clip retaining tab extending away from a second face of the main plate section for engagement with an edge of the rotor structure.

2. The bolt retention assembly of claim 1, wherein the bolt retention tabs are flexibly hinged to the main plate section.

3. The bolt retention assembly of claim 1, wherein the bolt retention tabs extend perpendicularly to the main plate section.

4. The bolt retention assembly of claim 1, wherein the first clip retaining tab extends perpendicularly to the main plate section.

5. The bolt retention assembly of claim 1, wherein the second clip retaining tab comprises a first segment and a second segment, the first segment extending perpendicularly from the main plate section and the second segment extending perpendicularly from the first segment to define a U-shaped slot with the main plate section.

6. The bolt retention assembly of claim 5, wherein the edge of the rotor structure is disposed in the U-shaped groove in an assembled condition of the bolt retention clip and the rotor structure.

7. The bolt retention assembly of claim 6, wherein the rotor structure includes a recess located adjacent the edge engaged with the second clip retaining tab.

8. The bolt retention assembly of claim 6, wherein the edge of the rotor structure and the second clip retaining tab are sized to be in an interference fit.

9. The bolt retention assembly of claim 1, wherein the bolt is a T-bolt.

10. The bolt retention assembly of claim 1, further comprising a nut secured to the bolt.

11. The bolt retention assembly of claim 1, wherein the plurality of rotor stages comprises a first rotor stage, a second rotor stage, and a third rotor stage.

12. The bolt retention assembly of claim 11, wherein the rotor structure is part of the third rotor stage.

* * * * *